United States Patent [19]

Nigawara et al.

[11] Patent Number: 5,436,511

[45] Date of Patent: Jul. 25, 1995

[54] APPARATUS FOR INTERRUPTING SUPPLY OF POWER FROM POWER SYSTEM TO PORTION OF CONSUMER LOAD IN RESPONSE TO CONTROL SIGNAL FROM POWER SYSTEM

[75] Inventors: Seiitsu Nigawara; Shigeaki Namba; Hiroshi Kohmoto, all of Hitachi, Japan

[73] Assignee: Hitachi, Ltd., Tokyo, Japan

[21] Appl. No.: 946,678

[22] Filed: Sep. 18, 1992

[30] Foreign Application Priority Data

Sep. 18, 1991 [JP] Japan ................................. 3-237816

[51] Int. Cl.⁶ .............................................. H02H 7/04
[52] U.S. Cl. .......................................... 307/39; 361/37
[58] Field of Search ..................... 307/39, 38, 66, 141; 361/35–38, 87

[56] References Cited

U.S. PATENT DOCUMENTS

| | | | |
|---|---|---|---|
| 4,456,832 | 6/1984 | Greer et al. | 307/38 |
| 4,644,320 | 2/1987 | Carr et al. | 340/310 A |
| 4,695,738 | 9/1987 | Wilmot | 307/31 |
| 4,819,180 | 4/1989 | Hedman et al. | 364/492 |
| 4,903,160 | 2/1990 | Elmore et al. | 361/37 |

FOREIGN PATENT DOCUMENTS 3426542  2/1989  Germany .

*Primary Examiner*—Thomas M. Dougherty
*Assistant Examiner*—Aditya Krishnan
*Attorney, Agent, or Firm*—Antonelli, Terry, Stout & Kraus

[57] ABSTRACT

A consumer load receiving power from a power system is divided into a first load to which power may be interrupted if necessary to reduce demand on the power system, and a second load to which power supply may not be interrupted to reduce demand on the power system. When it is necessary to reduce demand on the power system, the power system sends a load control signal to a controller at the consumer indicating that supply of power to the first load is to be interrupted. In response to the load control signal, the controller interrupts supply of power from the power system to the first load, thereby reducing demand on the power system.

6 Claims, 3 Drawing Sheets

FIG. I

APPARATUS FOR INTERRUPTING SUPPLY OF POWER FROM POWER SYSTEM TO PORTION OF CONSUMER LOAD IN RESPONSE TO CONTROL SIGNAL FROM POWER SYSTEM

BACKGROUND OF THE INVENTION

The present invention relates to a load power controlling apparatus provided for a user of an electric power system, and more particularly to a load power controlling apparatus which can contribute to balance between supply and demand (referred to as supply-demand balance) in the power system.

The power system is based on supply-demand balance of electric power. Usually, an electric power company supplies power and user's or consumers (factories, buildings, homes, etc.) consume it. When the supply-demand balance is lost, the voltage and frequency become unstable, thereby affecting several kinds of electric appliances. Thus, the supply-demand balance must be controlled so as to be as stable as possible.

However, generally, an electric power company is responsible for maintaining the supply-demand balance, whereas users consume the power necessary for them irrespective of the supply-demand balance in an electric power system. The electric power company therefore pays a vast sum of money to maintain the supply-demand balance.

Some users are provided with equipment for limiting the power consumed by themselves. One example is a demand control apparatus disclosed in JP-A-55-155523 (laid open on Dec. 3, 1980).

In recent years, an electric power system has a tendency that load increases in summer to lower the reserve margin of electric power. In the state where the supply reserve margin has been lowered, the electric power company may become unable to control the supply-demand balance.

As described above, the supply-demand balance control in an electric power system is usually the duty of an electric power company, and users consume electric power necessary for themselves without being concerned with the problem of unbalance of supply and demand of the power and reduction in the supply reserve margin. The above demand control apparatus limits power supply when a user consumes an amount exceeding a previously agreed amount of power, but does not entirely consider the supply-demand balance and the supply reserve margin at this time.

Under such a circumstance, the consumers are obliged to consider the problems of the demand-supply balance and the supply reserve margin.

SUMMARY OF THE INVENTION

An object of the present invention is to provide a load power controlling apparatus which controls the electric power to be consumed by a user himself, considering the operating state of an electric power system represented by supply-demand balance and supply reserve margin.

The load power controlling apparatus installed at a consumer has a load unit divided into plural load sections, one of which is controlled in accordance with the state where the electric power company operates an electric power system and can be opened appropriately under the condition of reduction in the supply reserve margin.

In accordance with the present invention, a consumer can use more economical power by contracting with an electric power company to use a power supply line with a different quality corresponding to the property of a load. The electric power company can partially limit power supply at its own convenience so as to contribute to maintaining the supply-demand balance.

DESCRIPTION OF THE PREFERRED EMBODIMENTS

Figure 1:
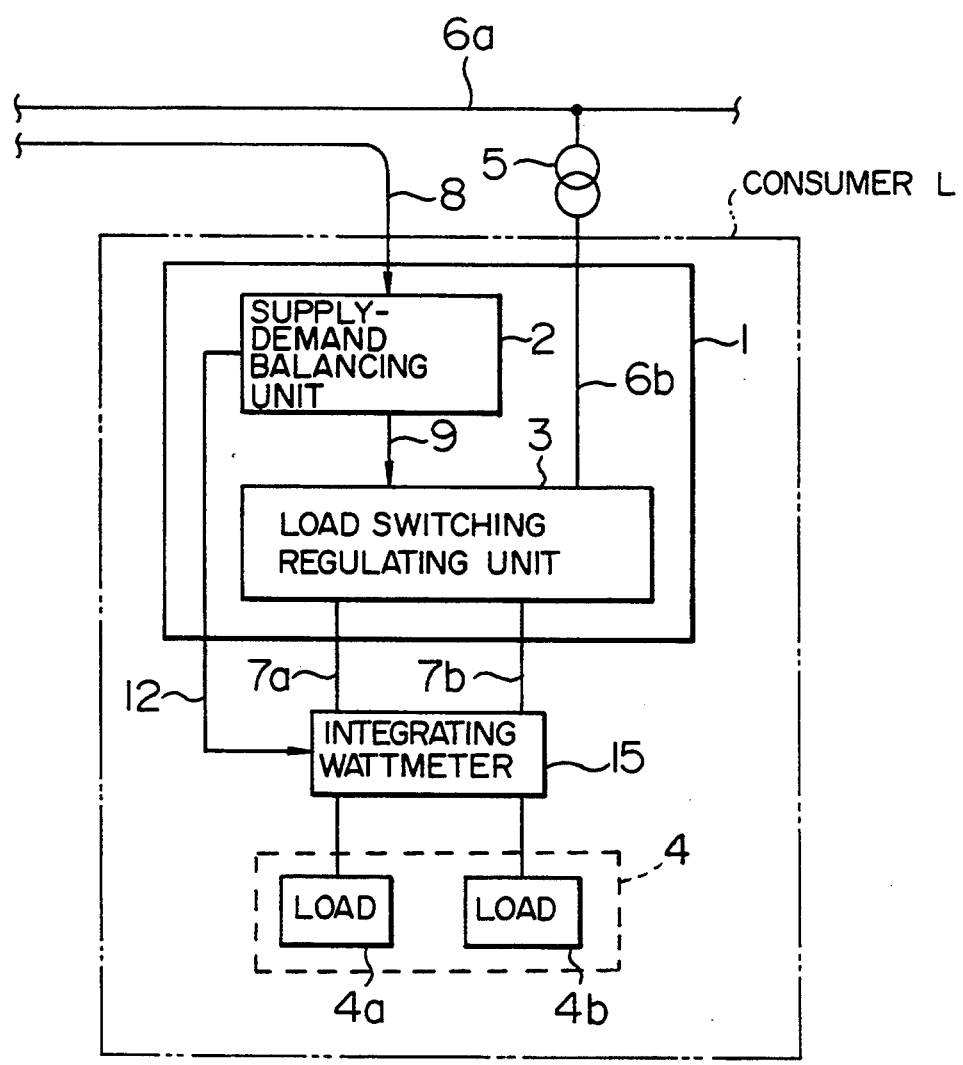
FIG. 1 is a block diagram showing an entire arrangement of the load power controller according to one embodiment of the present invention.

Referring to FIG. 1, an explanation will be given of the load power controller according to one embodiment of the present invention.

The load power controller according to the present invention is installed at a consumer L. Power is supplied to the consumer L by way of a power line 6a, a transformer 5 and a power distribution line 6b from an electric power system, and supplied to loads 4a and 4b within the consumer where it is consumed. In the present invention, a load unit 4 is divided into some individual loads, and the manners of supplying power to at least the loads 4a and 4b are different. Specifically, the load 4b connected with a power distribution line 7b is basically permitted to consume power freely to a necessary degree at any time, whereas power supply to the load 4a connected with a power distribution line 7a is limited by the circumstances on a power supply side.

A power supply-demand controller 1 controls switching of the load unit 4 in accordance with a load control signal 8 supplied from e.g., a central power supply command station of an electric power company. The power supply-demand controller 1 is composed of a supply-demand balancing unit 2 and a load switching regulating unit 3.

Figure 2:
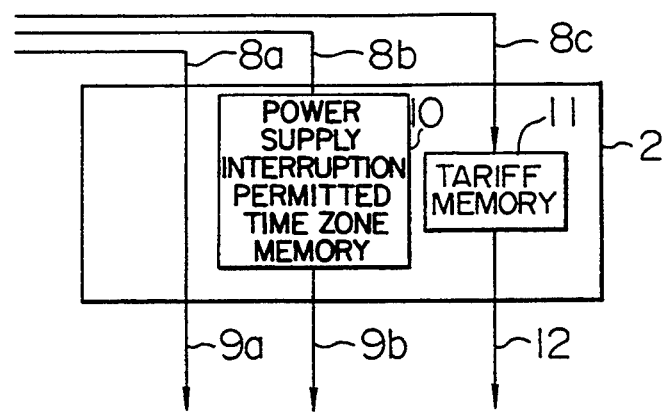
FIG. 2 is a view showing a typical concrete configuration of the supply-demand balancing unit in the load power controller.

The power supply-demand balancing unit 2 is constructed as shown in FIG. 2. The power supply-demand balancing unit 2 is supplied with the load control signal 8 from the central power supply command station. The load control signal 8 includes a power supply interrupting signal 8a for indicating if power supply to a load is to be interrupted or not, a power supply interruption permitted time zone setting signal 8b and a power tariff setting signal 8c for setting different power tariffs according to different manners of supplying power. The power supply interruption permitted time zone setting signal 8b is stored in a power supply interruption permitted time zone memory 10, and the power tariff setting signal 8c is stored in a tariff memory 11.

Figure 3:
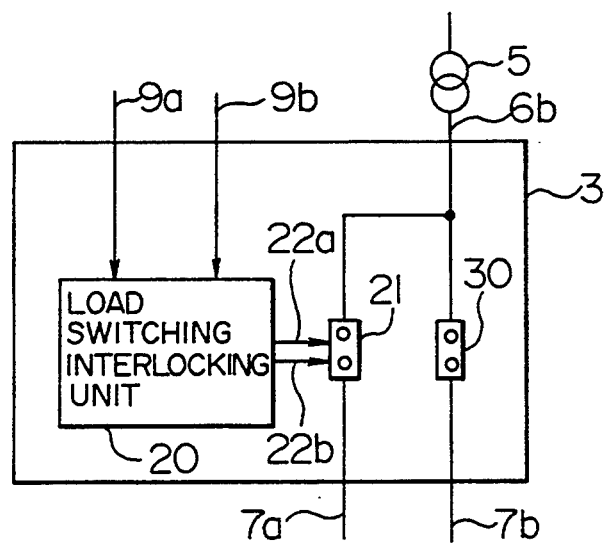
FIG. 3 is a block diagram showing a typical concrete configuration of the load switching regulating unit in the load power controller.

Signals 9a and 9b from the supply-demand balancing unit 2 are sent to the load switching regulating unit 3 the details of which are shown in FIG. 3. Although the power supply interrupting signal 8a is outputted without being processed from the power supply-demand balancing unit 2, the outputted signal is designated by 9a to discriminate it from the signal 8a. The power distribution line 6b is routed from the transformer 5 to the load switching regulating unit 3. The power distribution line 6b is branched into the power distribution line 7b for supplying power to the load 4b which is permitted Go consume power freely and the power distribution line 7a for supplying power to the load 4a for which power consumption can be limited. Breakers 21 and 30 are arranged in portions of the branched power distribution lines 7a and 7b within the load switching regulating unit 3. Although both breakers are opened by a protective relay (not shown) when a fault occurs in the power distribution lines 7a and 7b, the breaker 21 for the power distribution line 7a supplying power to the load 4a for which power consumption can be limited is also switching-controlled by a load switching interlocking unit 20 separately.

Figure 4:
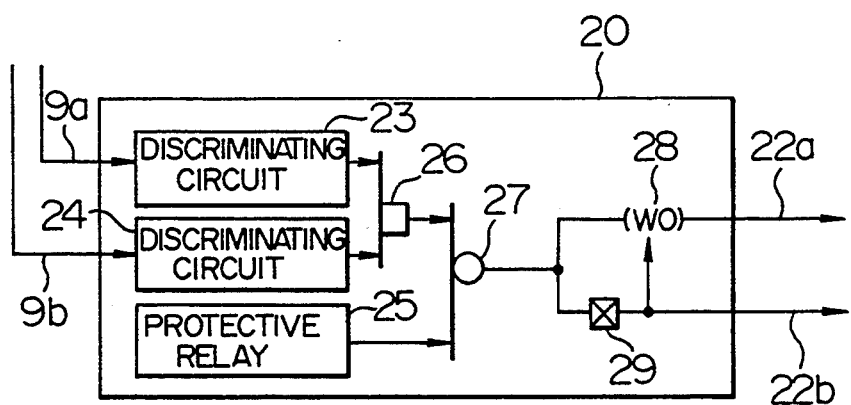
FIG. 4 is a block diagram showing a typical concrete configuration of the load switching interlocking unit in the load power controller.

The switching logic of the load switching interlocking unit 20 will be explained with reference to FIG. 4. In FIG. 4, reference numeral 25 denotes a protective relay for detecting a fault in the power distribution line 7a. When the protective relay operates, irrespective of other conditions, an opening command signal 22a is outputted through an OR circuit 27 and a storage circuit 28, thereby opening the breaker 21. A discriminating circuit 23 produces an output signal when the power supply interrupting signal indicates that power supply to the load 4a is to be interrupted. A discriminating circuit 24 produces an output signal when the power supply interruption permitted time zone setting signal 9b indicates a time zone permitting interruption of power supply. Thus, when power supply interruption is indicated during a time zone permitting interruption of power supply, an AND circuit 26 produces an opening command signal 22a through the OR circuit 27 and the storage circuit 28, thereby opening the breaker 21. As evident from the above logic, under conditions other than when power supply interruption is indicated during a time zone permitting interruption of power supply, the OR circuit produces no signal. Thus, a NOT circuit 29 produces a closing command signal 22b, thereby placing the breaker 21 in a closed state (assuming that the protective relay does not operate). Incidentally, when the closing command signal 22b is proved, the storage circuit 28 is reset, thereby canceling the breaker opening command signal 22a.

Finally, the signal 12 supplied from the power supply-demand balancing unit 2 is sent to an integrating wattmeter 15 as shown in FIG. 1 so that different power tariffs are set for the power distribution lines 7a and 7b. The power tariff for the load 4a for which power consumption can be limited is more economical than that for the load 4b which is permitted to consume power freely.

Thus, power consumption by the consumer L in FIG. 1 is controlled in accordance with the load control signal 8 (which includes the power supply interrupting signal 8a, the power supply interruption permitted time zone setting signal 8b and the power tariff setting signal 8c). The load control signal 8 is produced and transmitted in accordance with the procedure shown in FIGS. 5A–5C which is performed by, e.g., the central power supply command station.

Figure 5A:
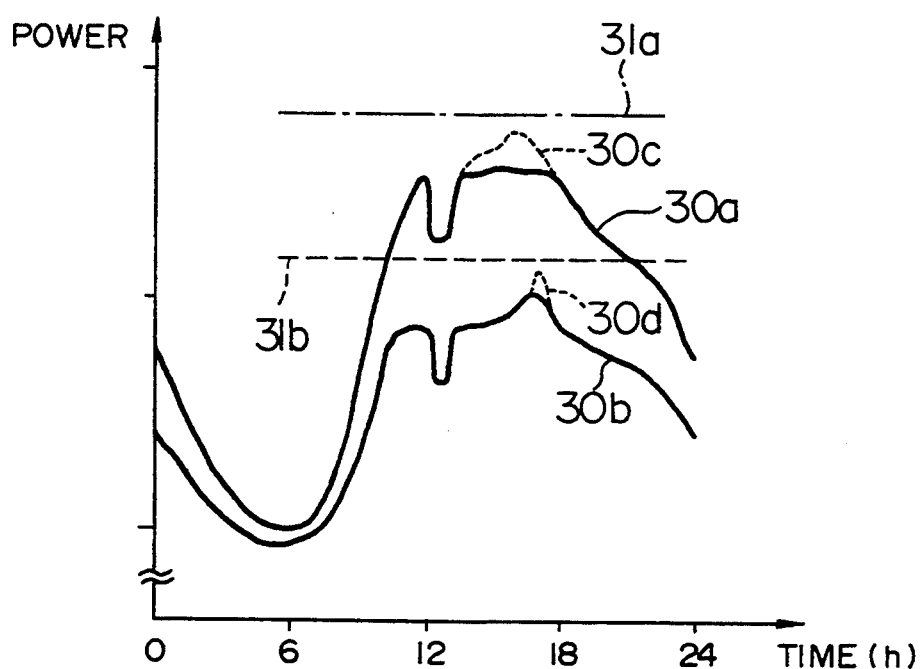
FIGS. 5A, 5B and 5C are views for explaining an exemplary manner of forming a load command signal on a power supply side.

FIG. 5A shows a 'daily load curve' which represents power (ordinate) demand over respective time 24 hours (abscissa) in one day. In FIG. 5A, reference numeral 30a represents a typical summer daily load curve, and reference numeral 30b represents a typical winter daily load curve. Reference numeral 31a (one-dot chain line) represents the maximum supply power in summer which can be supplied by all operable power stations possessed by an electric power company, and reference numeral 31b (broken line) represents the maximum supply power in winter. These amounts of maximum supply power are determined by the central power supply command station. The reason why the maximum supply power is different between summer and winter is that a periodic test for the power stations is carried out in winter with less power demand in preparation for summer with more power demand. Thus, the power supply reserve margin throughout the year is maintained substantially uniform.

Figure 5B:
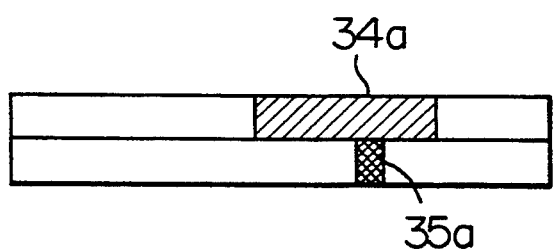
Figure 5C:
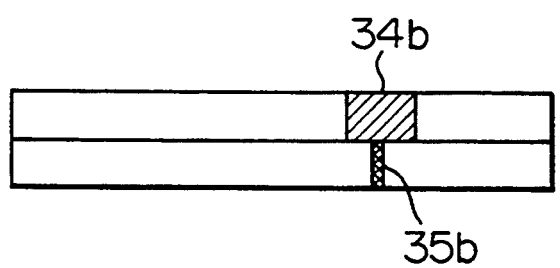

FIG. 5B shows a power supply interruption permitted time zone 34a and power supply interrupting signal 35a in summer, whereas FIG. 5C shows a power supply interruption permitted time zone 34b and a power supply interrupting signal 35b in winter. In the figures abscissa represents time. Since the daily load curve is determined on the basis of past experience e.g., the average value of a load change in the same season in the last year and the result in a previous day, the power supply interruption permitted time zone 34a or 34b may be optionally set in accordance with the maximum supply power 31a or 31b and the load value at an individual time, e.g., for a period when the supply reserve margin is expected to decrease to 10% or less. In FIGS. 5B and 5C, the time zones 34a and 34b when power supply can be interrupted if necessary are shaded. However, the power supply interruption 34a or 34b permitted time zone set on the basis of past experience does not take into account changes in the load in the present day experience. Therefore, when the power supply-demand in the present day approaches the maximum supply power beyond the expectation (dotted lines 30c and 30d in FIG. 5A represent load changes in the present day), a power supply interrupting signal 35a or 35b is produced.

In this way, the central power supply command station can switch off the load 4a in FIG. 1 when an unexpected abrupt increase in power occurs, thereby assuring stability in the power supply to the load 4b. Also, when an unexpected power demand increases, the central power supply command station is not required to ask each individual large consumer to shed (or decrease) load. On the other hand, the power consumer can save money by contracting for a lower tariff for the load 4a for which power supply stability is not as important as it is for the load 4b.

As understood from the above description, a consumer can use more economical power by contracting with an electric power company to use a power supply line with a different quality corresponding to the property of a load. The electric power company can partially limit power supply at its own convenience so as to contribute to maintaining the supply-demand balance.

We claim:

1. An apparatus for controlling supply of power from a power system to a load in response to a load control signal from the power system, the apparatus comprising:

a first load to which supply of power from the power system may be interrupted;

a second load to which supply of power from the power system may not be interrupted;

a breaker for connecting the first load to the power system such that the power system supplies power to the first load via the breaker;

connecting means for connecting the second load to the power system such that the power system supplies power to the second load via the connecting means;

first control means for producing a power supply interrupting signal in response to a load control signal from the power system, the load control signal indicating that supply of power from the power system to the first load is to be interrupted; and second control means for opening the breaker in response to the power supply interrupting signal.

2. An apparatus according to claim 1, wherein the second control means includes:

a protective relay for producing a breaker opening command when a fault occurs on a load side of the breaker;

an OR gate for receiving the power supply interrupting signal and the breaker opening command, and for producing an output signal indicating that the breaker is to be opened when either one of the power supply interrupting signal and the breaker opening command is received; and means for opening the breaker in response to the output signal of the OR gate, thereby opening the breaker in response to either one of the power supply interrupting signal and the breaker opening command.

3. An apparatus according to claim 2, wherein the first control means also produces a time zone signal indicating a time zone during which supply of power from the power system to the first load may be interrupted;

wherein the second control means further includes an AND gate for receiving the power supply interrupting signal and the time zone signal, and for outputting the power supply interrupting signal only when the power supply .interrupting signal occurs during the time zone indicated by the time zone signal; and wherein the OR gate receives the power interrupting signal outputted from the AND gate.

4. An apparatus according to claim 1, wherein the second control means opens the breaker only when the power supply interrupting signal occurs during a predetermined time zone.

5. An apparatus according to claim 1, wherein the second control means automatically opens the breaker in response to the power supply interrupting signal, thereby automatically interrupting supply of power from the power system to the first load in response to the load control signal.

6. An apparatus for controlling supply of power from a power system to a load, the apparatus comprising:

a first load to which supply of power from the power system may be interrupted;

a second load to which supply of power from the power system may not be interrupted;

a first breaker for connecting the first load to the power system such that the power system supplies power to the first load via the first breaker;

a second breaker for connecting the second load to the power system such that the power system supplies power to the second load via the second breaker;

protective relay means for producing a first breaker opening command when a fault occurs on a load side of the first breaker, and for producing a second breaker opening command when a fault occurs on a load side of the second breaker;

first control means for producing a power supply interrupting signal in response to a load control signal from the power system, the load control signal indicating that supply of power from the power system to the first load is to be interrupted; and second control means for opening the first breaker in response to either one of the power supply interrupting signal and the first breaker opening command, and for opening the second breaker only in response to the second breaker opening command.

* * * * *